No. 628,750. Patented July 11, 1899.
A. BRÉCHOT.
SPARK ARRESTER AND DRAFT PRODUCER FOR FURNACES.
(Application filed July 29, 1898.)
(No Model.)
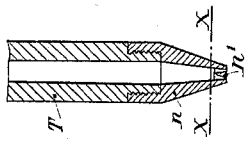
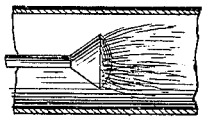
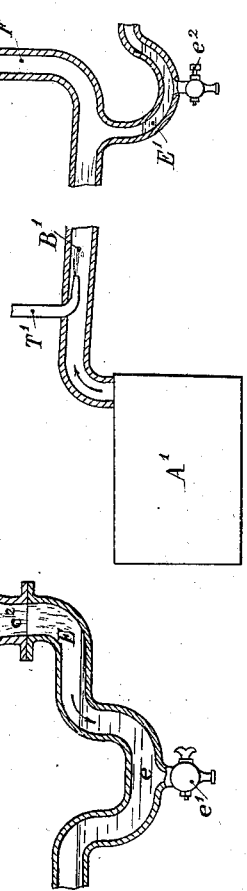
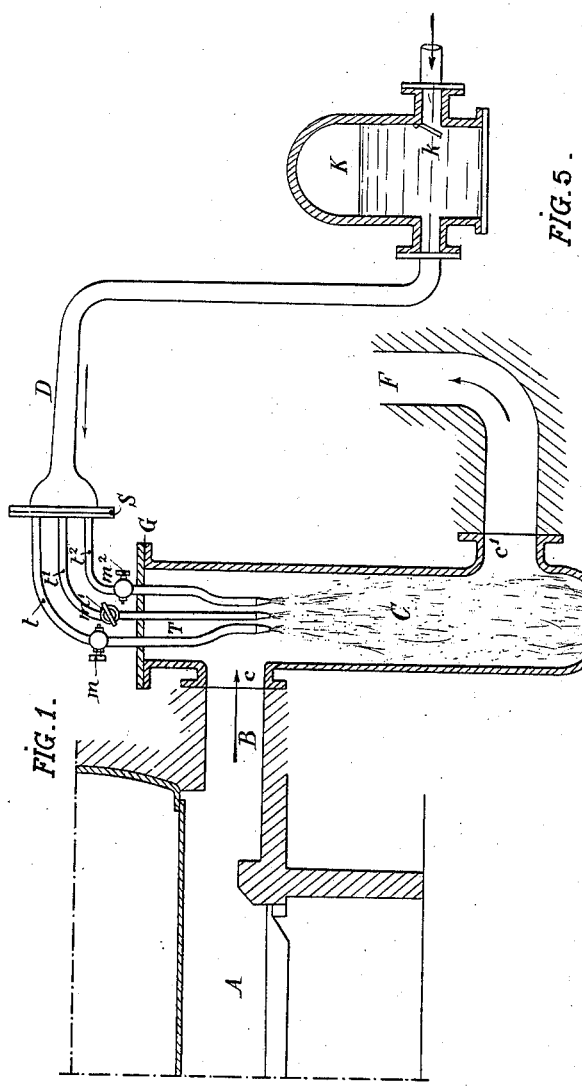
Witnesses
Inventor

UNITED STATES PATENT OFFICE.

ARTHUR BRÉCHOT, OF VERSAILLES, FRANCE.

SPARK-ARRESTER AND DRAFT-PRODUCER FOR FURNACES.

SPECIFICATION forming part of Letters Patent No. 628,750, dated July 11, 1899.

Application filed July 29, 1898. Serial No. 687,198. (No model.)

*To all whom it may concern:*

Be it known that I, ARTHUR BRÉCHOT, of Avenue de Villeneuve l'Etang, Versailles, in the Republic of France, have invented certain new and useful Improvements in Spark-Arresters and Draft-Producers for Furnaces, (for which application for a patent has been made in France, dated May 21, 1898, No. 265,923; in Belgium, dated July 1, 1898, No. 136,740; in Great Britain, dated July 2, 1898, No. 14,619; in Germany, dated July 5, 1898, and in Austria, dated July 5, 1898,) of which the following is a specification.

This invention relates to certain improvements in the means of producing an intense draft in furnaces and of suppressing at the same time a large part of the smoke.

It consists, essentially, in introducing in any suitable manner into the flue for the escape of the gases of combustion one or more jets of cold water under pressure, the effect of which is to cause a depression which produces a vigorous suction of the gases. The water introduced, being at a temperature much below that of the gases of combustion, produces a cooling of the latter, and consequently a diminution of their volume, which is also a cause of the acceleration of the draft. Finally, the gases of combustion are forced to enter into intimate contact with the water, which in consequence of its violent projection becomes atomized, and consequently dust and solid particles of carbon mixed with the gas are carried away by the water, and thus smoke and the danger of fire occasioned by incandescent particles of carbon are avoided.

As this improved method of draft, which depends entirely on the pressure of the water and its abundance, is much more energetic than that resulting from the height of chimneys, it follows that it enables the latter to be dispensed with under certain circumstances and that in any case variations in the intensity of the draft due to the conditions of the atmosphere are no longer to be feared.

The means which I employ for putting my invention into practice will now be described in detail, reference being made to the accompanying drawings, in which—

Figure 1 is a sectional elevation of the device for increasing the draft by the injection of water. Fig. 2 is a view, on an enlarged scale, of the end of the nozzle of a twyer or tube; Fig. 3, a cross-section on the line X X of Fig. 2. Fig. 4 shows a modification in the means employed for injecting the water. Fig. 5 shows another arrangement for the injection of water into the flue for discharging the gases of combustion.

In Fig. 1, A indicates the furnace of a steam-generator, but this furnace may be of any other suitable kind, such as a domestic fire-furnace, fire, or the like. B is the flue for the discharge of the gases of combustion. C is a box of cylindrical or any other suitable form, vertical or inclined, according to requirements, made of cast or sheet iron or any other suitable material. The transverse section of the box is in proportion to the section of the gas-flue and its height such that the jet of water injected has room to expand and to touch the walls before reaching the orifice $c'$, by which the gases escape. This box or chest C has at its upper part a lateral tubulure $c$, which connects in a suitable manner with the smoke-flue B. At the lower part of the box a tubulure $c'$ connects with the flue or shaft $f$, which discharges the gases into the open air. The lower part of the box C is terminated by a tubulure $c^2$, which connects with a pipe E, through which the water is discharged. The pipe E is curved siphon-fashion, so that the part $e$ is always filled with water and the gases of combustion cannot escape through this pipe E, which in certain cases would cause inconvenience. At the bottom of the siphon there is a valve $e'$, enabling the water contained in the siphon, together with the dust which it retains, to be discharged from time to time.

The upper part of the box C is closed by a lid G, traversed in a tight manner by twyers T, which discharge jets of water under pressure into the box C. These twyers are formed of a series of pipes $t\ t'\ t^2$, one end of each of which is fitted in a plate S, and the other end, forming the beak of the twyer, is contracted in such a way as to force the water to emerge in the form of a jet. As may be seen in Fig. 2, which shows on an enlarged scale the beak of the twyer, this beak n is of bronze or other hard fire-resisting metal, and it is attached to and screwed on the extremity of the pipe T.

For the object of dividing the jet on its exit from the twyer a cross-piece $n'$ may be placed in the interior of the discharge-orifice, as may be seen in plan view in Fig. 3. This cross-piece placed across the orifice of the twyer has for effect to spray the water when it is discharged under pressure, and the water coming thus in the form of a spray in contact with the gases of combustion is intimately mixed with them and removes all solid particles, while at the same time by its violent expansion it considerably accelerates the draft. It has been shown that the orifice of the twyer is intercepted by a cross-piece $n'$ having the form of a cross; but the said orifice might be intercepted by a single cross-bar instead of two cross-bars in the form of a cross. These cross-bars may of course be formed in any suitable manner—for instance, by the bars of triangular section, wires, or network, and the said wires may be single or one or more may be twisted together. In a similar manner the beak of the twyer may not be fitted on, but may form a single piece with, the pipe T.

The twyers $t\ t'\ t^2$ are provided with taps $m\ m'\ m^2$ in order to allow of the passage of the water being intercepted or shut off. I have shown in the drawings three twyers; but I may employ a larger or less number, according to the size of section of the box C. In certain cases a single twyer will suffice, and the intensity of the jet may be regulated by opening more or less a tap, such as $m$. In case there are several twyers the activity of the draft may be regulated by opening the taps of a greater or less number of twyers or even of all the twyers simultaneously. Instead of employing one or more twyers I may, if preferred, give the end of the water injection-pipe the form of a rose, as shown in Fig. 4, or even any other suitable form.

The water reaches the twyers T by means of a pipe D, having a flange bolted on the plate S. The water is sent under pressure into the pipe D by any suitable means—for instance, by drawing it from a very elevated reservoir. More frequently a suction and compression pump is employed, which sends the water under pressure into the pipe D. In this case it is preferable to insert an air-bell K in order to diminish the shocks and render the arrival of the water regular in the twyers. This bell is provided with a valve $k$ for retaining the water. It is preferable to insert this bell for the regularity of the working of my apparatus, but it is not indispensable.

My apparatus works the better the lower the temperature at which the water is injected; but in case it is desired to effect an economy of water the same water may be employed several times. For this object the water on its discharge from the pipe E is collected in a reservoir, which is not shown in the drawings, from whence it is again drawn by a pump, which sends it again into the pipe D. It is well to insert in the water-reservoir a filter-cloth for retaining the carbon-dust carried away by the water.

It will be seen in Fig. 5, where A' represents any suitable furnace, that in certain peculiar cases water may be injected directly into the flue for carrying off the gases of combustion by means of a twyer T', which projects into the flue B' and is curved back in such a way as to discharge the jet of water in the direction of the pipe. In certain cases it is not necessary to employ a flue or pipe F' rising upward to discharge gases into the atmosphere. It is sufficient to prolong the part of the tube B' more or less with a suitable slope, and the gases of combustion will be discharged with the water. If it be found preferable to discharge the gases into the atmosphere by means of a tube bending vertically upward, such as F', a tube forming a siphon E', with a discharge-valve $e^2$ for discharging the water and the dust which may be mixed therewith, must be employed. It is easy to understand that in thus sending water under pressure by means of one or more jets an active suction of the gases of the furnace will be produced and at the same time the gas will be cooled, which produces a condensation in volume, and consequently constitutes another cause of increase in the draft. The gases are at the same time deprived of particles of carbon, which are carried away by the water, the draft being more powerful as the pressure of water is stronger.

I declare that what I claim is—

1. A device for assisting the draft of furnaces comprising a chamber connected with a flue of a furnace, water-pipes entering the said chamber at the top so that water may be forced into the chamber under pressure to increase the draft and remove the dust, means upon the ends of the said water-pipes for spraying the water into the chamber so as to practically fill its area, means for conducting water and dust in one direction from the said chamber and the draft in another direction, and means for preventing the draft from passing out through the waste-water pipe, substantially as described.

2. In combination with the flue of a furnace for carrying off the gases of combustion; a downtake-box forming a chamber very high in proportion to its section having three orifices, one orifice being connected with the flue conveying the gases, another orifice with the pipe flue or chimney for the discharge of the gases in one direction, and the third orifice with a pipe for discharging the water in a different direction; a plate or lid for closing the upper part of the box; one or more twyers passing in a tight manner through the lid, the beaks of said twyers being very contracted and provided with cross-bars for discharging the water in the form of a spray, taps for closing and opening the twyers; a pipe for bringing water to the twyers; means of connecting the said pipe with the twyers; a pipe having a siphon for discharging the water; and a sludge-valve substantially as described.

In witness whereof I have hereunto signed my name, this 11th day of July, 1898, in the presence of two subscribing witnesses.

ARTHUR BRÉCHOT.

Witnesses:
    JACQUES CONDOMY,
    AUGUSTE FOURNOL.